H. A. PERRY.
FISH SCALER.
APPLICATION FILED FEB. 9, 1918.
1,281,200.
Patented Oct. 8, 1918.
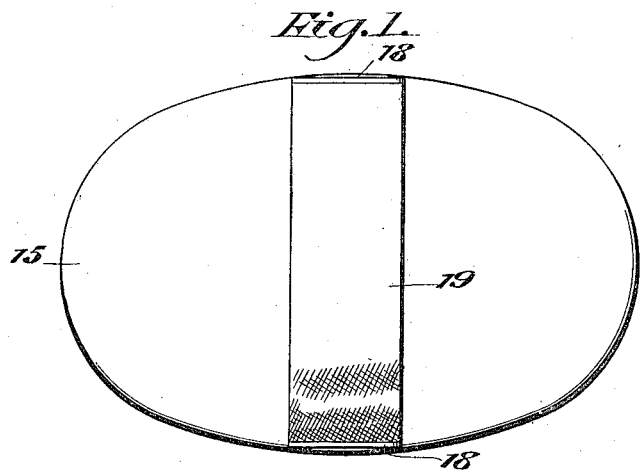
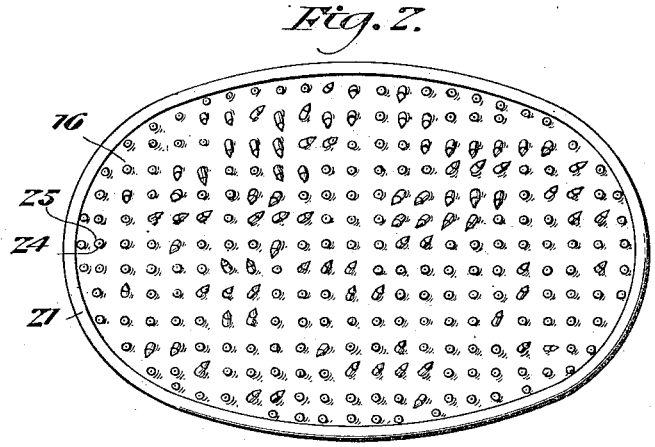
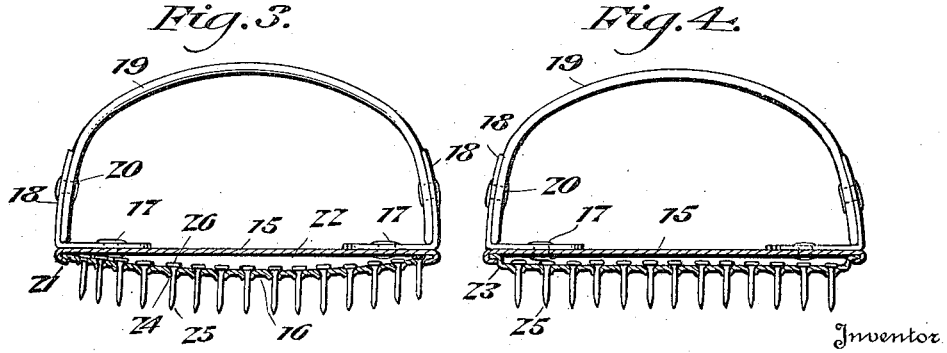
Witnesses
Inventor
Harlan A. Perry
By Victor J. Evans
Attorney

UNITED STATES PATENT OFFICE.

HARLAN A. PERRY, OF WESTBORO, MASSACHUSETTS.

FISH-SCALER.

1,281,200.   Specification of Letters Patent.   Patented Oct. 8, 1918.

Application filed February 9, 1918. Serial No. 216,269.

*To all whom it may concern:*

Be it known that I, HARLAN A. PERRY, a citizen of the United States, residing at Westboro, in the county of Worcester and State of Massachusetts, have invented new and useful Improvements in Fish-Scalers, of which the following is a specification.

This invention relates to fish scaling devices and it has for its object to produce a device of simple and improved construction, adapted to be manually used, whereby the scales may be thoroughly and quickly removed from a fish without tearing or otherwise injuring the same.

A further object of the invention is to produce a fish scaling device embodying in the construction thereof a supporting member with which numerous prongs are loosely connected whereby when the device is in use, the prongs will yield in practically all directions, so that they will not only serve to remove the scales from a fish, but will also be practically self-cleaning.

A further object of the invention is to produce a simple and improved construction whereby the flexible prongs may be quickly and easily assembled with the supporting device, thereby reducing the cost of construction and assemblage.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the claims may be resorted to when desired.

In the drawing:

Figure 1 is a top plan view of a fish scaling device constructed in accordance with the invention.

Fig. 2 is a bottom plan view of the same, parts having been removed to expose other parts.

Fig. 3 is a transverse sectional view taken on the line 3—3 in Fig. 1.

Fig. 4 is a transverse sectional view illustrating a modification.

Corresponding parts in the several figures are denoted by like characters of reference.

The body portion of the improved device comprises a top plate 15 and a bottom plate 16, said plates being preferably made of sheet metal of any kind and thickness adapted for the purpose. The top plate is preferably flat and I have shown connected therewith by rivets 17 a pair of angle plates 18 constituting brackets with which a handle 19 of leather or other suitable material may be connected by rivets or other convenient means indicated at 20. The top plate 15 is preferably of elliptical shape and the angle plates forming the handle attaching brackets are disposed at the side edges thereof at opposite sides of the longer diameter and about midway between the ends of the plate. Be it understood, however, that no limitation is intended to be made as to the particular shape of the plate, its dimensions, the location of the handle, or the precise manner of attaching the latter.

The bottom plate 16 of the body portion is shaped substantially like the top plate but it is of slightly smaller dimensions so that, when the plates are placed together, the top plate will project marginally beyond the bottom plate, such marginal portion being, however, utilized of the formation of a bead flange 21 which is folded upon the bottom plate so as to assemble the latter securely with the top plate. The bottom plate is dished downwardly as clearly seen in Fig. 3 so that, when it is assembled with the top plate, there will be an open space, indicated at 22, between the top and bottom plates. Instead of merely dishing the bottom plate, a portion of said plate bounded by that portion on which the bead 21 is folded may be offset downwardly, as shown at 23 in Fig. 4. When the latter construction is resorted to, the portions of the top and bottom plates which are bounded by the bead 21 will be equally spaced apart throughout, while, when the construction illustrated in Fig. 3 is adapted, the distance between the body portions of the top and bottom plates will increase from the edges in an inward direction.

The bottom plate 16 is provided with numerous perforations 24, the same being punched or otherwise formed therein, and through each perforation extends a prong or pin 25 having a head 26 whereby it will be retained in a downwardly extending position with respect to the bottom plate. The distance between the opposed faces of the top and bottom plates must not be so great as to permit any of the pins or prongs to slip back into the space between the said faces, but the distance between the opposed faces must on the other hand be sufficient to permit the pins or prongs considerable freedom of movement enabling them to yield in any direction when the implement is in use.

To use the implement, the operator inserts his hand between the handle and the top plate, pressing firmly on the latter with his palm and fingers. The device may then be reciprocated over the body of the fish, thereby detaching the scales and at the same time causing the scales to detach themselves from the pins or prongs owing to the fact that the latter will yield according to the direction in which the device is moved. By making the device of proper size, it will be adapted for cleaning fish of large or small size, and the cleaning operation may be performed in a very perfect manner and in an extremely short time.

Having described the invention what I claim as new is:

1. A device of the class described, comprising top and bottom plates assembled together along their marginal edges, said plates being spaced apart intermediate their marginal edges and the bottom plates being provided with numerous holes, in combination with headed pins extending through the holes, the heads lying within the interspace between the top and bottom plates, whereby the pins will be free to tilt and move in various directions.

2. A device of the class described, comprising a bottom plate having numerous headed pins projecting loosely and flexibly therethrough, and a top member assembled with the bottom plate to retain the pins with freedom for individual movement.

3. A device of the class described, comprising a bottom plate having numerous headed pins projecting loosely and flexibly therethrough, and a top member assembled with the bottom plate to retain the pins with freedom for individual movement, said top member having a handle connected therewith.

4. A device of the class described, comprising a bottom plate having numerous headed pins projecting therethrough, and a top member assembled with the bottom plate by a marginal bead, said top member being spaced from the bottom plate to retain the pins with freedom for individual movement.

5. A device of the class described, comprising a bottom plate having numerous headed pins projecting therethrough, and a top member assembled with the bottom plate by a marginal bead, said top member being spaced from the bottom plate to retain the pins with freedom for individual movement, said top member having angular brackets connected therewith at opposite sides thereof; and a handle connected with said brackets.

In testimony whereof I affix my signature.

HARLAN A. PERRY.

Copies of this patent may be obtained for five cents each, by addressing the "Commissioner of Patents, Washington, D. C."